(12) United States Patent
Srinivas

(10) Patent No.: US 6,831,194 B2
(45) Date of Patent: Dec. 14, 2004

(54) SURFACE MODIFICATION OF CARBONACEOUS MATERIALS BY INTRODUCTION OF GAMMA KETO CARBOXYL CONTAINING FUNCTIONAL GROUPS

(75) Inventor: Bollepalli Srinivas, Marietta, GA (US)

(73) Assignee: Columbian Chemicals Company, Marietta, GA (US)

( * ) Notice: Subject to any disclaimer, the term of this patent is extended or adjusted under 35 U.S.C. 154(b) by 286 days.

(21) Appl. No.: 10/230,044

(22) Filed: Aug. 28, 2002

(65) Prior Publication Data

US 2004/0040470 A1 Mar. 4, 2004

(51) Int. Cl.[7] .............................................. C07C 229/00
(52) U.S. Cl. ..................... 562/459; 562/577; 106/472
(58) Field of Search ................................ 562/459, 577; 106/472

(56) References Cited

U.S. PATENT DOCUMENTS

2001/0032569 A1   10/2001   Bergemann et al. ........ 106/472

FOREIGN PATENT DOCUMENTS

EP   1134261 A   9/2001

OTHER PUBLICATIONS

March, J., *Advanced Organic Chemistry*, 4th Ed., Wiley Publishers, New York (1992) Chapter 11, pp. 539–542.

Cram, D.J. et al., *Organic Chemistry*, 2nd Ed., Mc–Graw–Hill, New York (1964) Chapter 19, pp. 439–444.

Agranat, I. et al., "The Scope of the Harworth Synthesis," *J. Chem. Educ.* (1976) 53, 488.

Vogel, A.I., *Practical Organic Chemistry*, 3rd Ed., Longmans, London (1956) Chapter 4, pp. 519–520.

*Primary Examiner*—Paul J. Killos
(74) *Attorney, Agent, or Firm*—Needle & Rosenberg, P.C.

(57) ABSTRACT

The present invention provides a method for the preparation of carbonaceous materials comprising a plurality of gamma-keto-carboxyl containing functional groups surface bonded thereto, and further provides several surface modified carbonaceous materials resulting therefrom.

44 Claims, 6 Drawing Sheets

X-Ray Photoelectro Survey Spectrum of Raven 2500

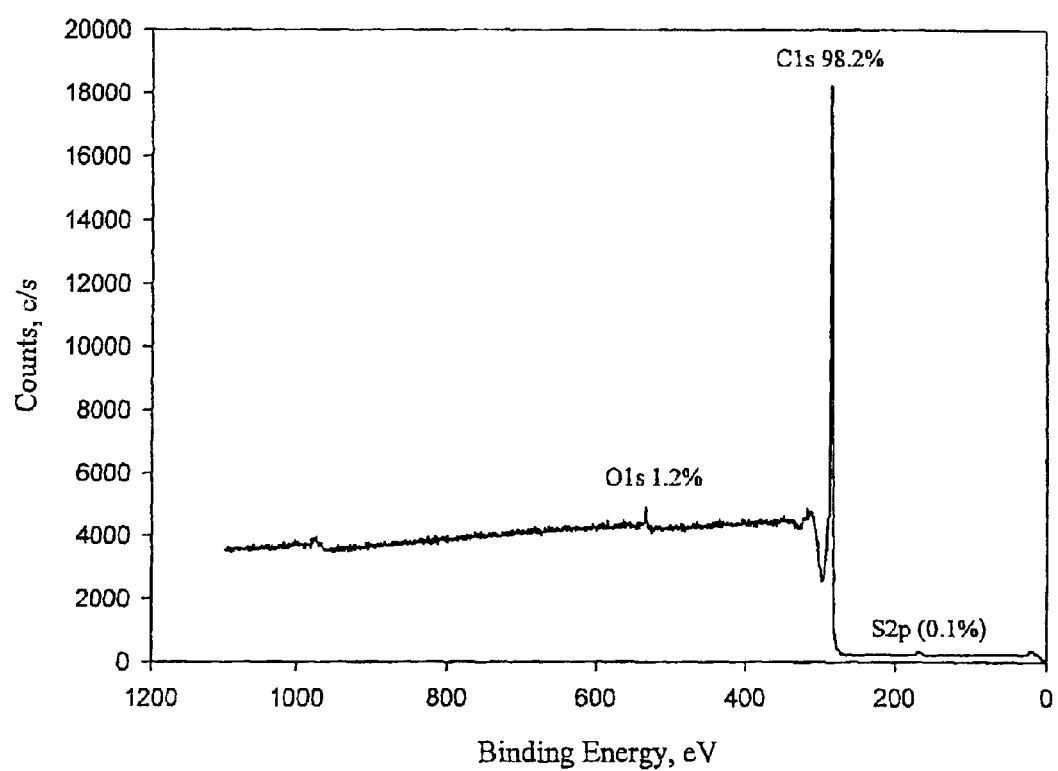
Figure 1 X-Ray Photoelectro Survey Spectrum of Raven 2500

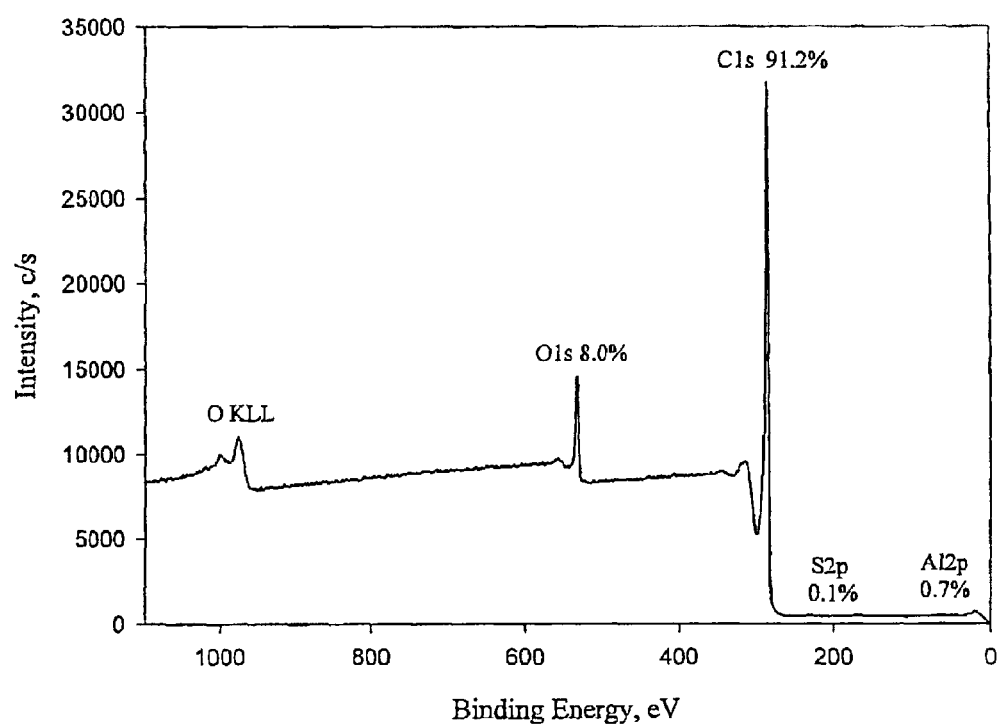
Figure 2 X-Ray Photoelectron Survey Spectrum of Succenoylated Raven 2500

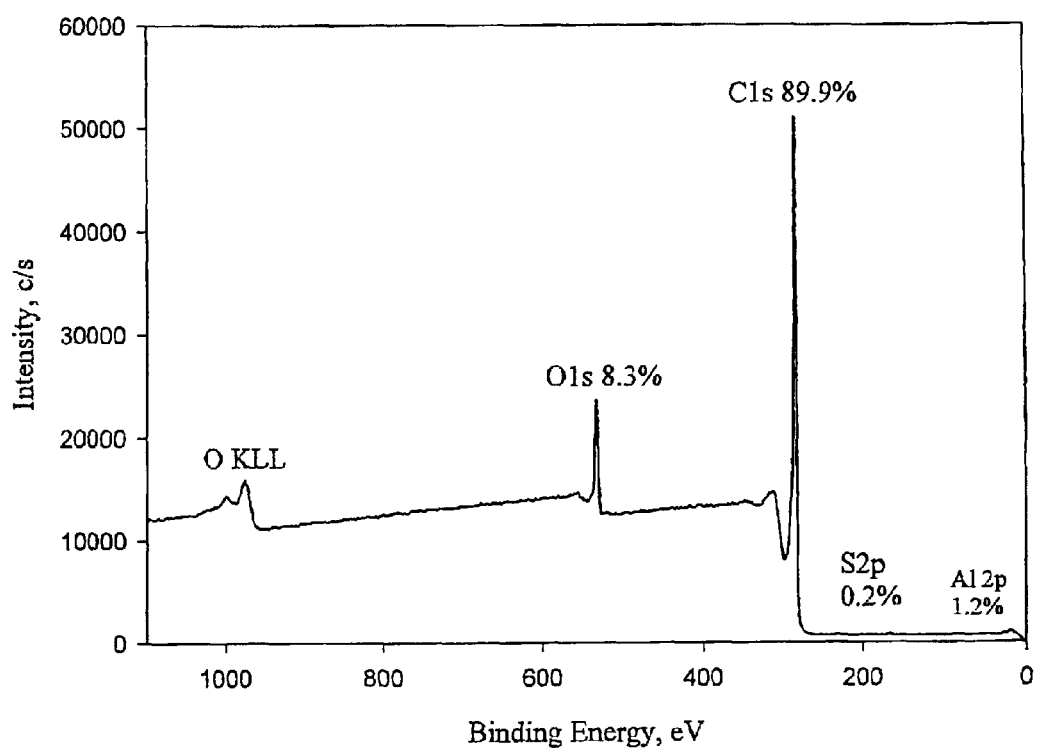
Figure 3 X-Ray Photoelectron Survey Spectrum of Phthaloylated Raven 2500

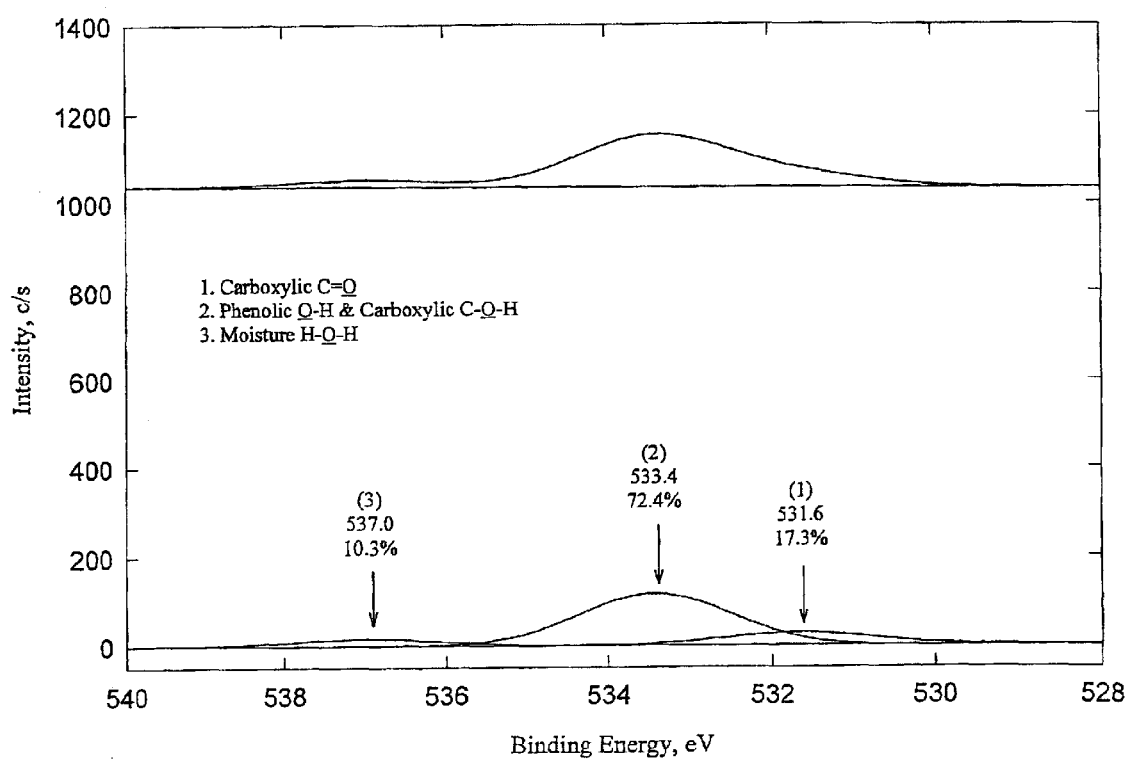
Figure 4 XPS of O1s Region in Raven 2500

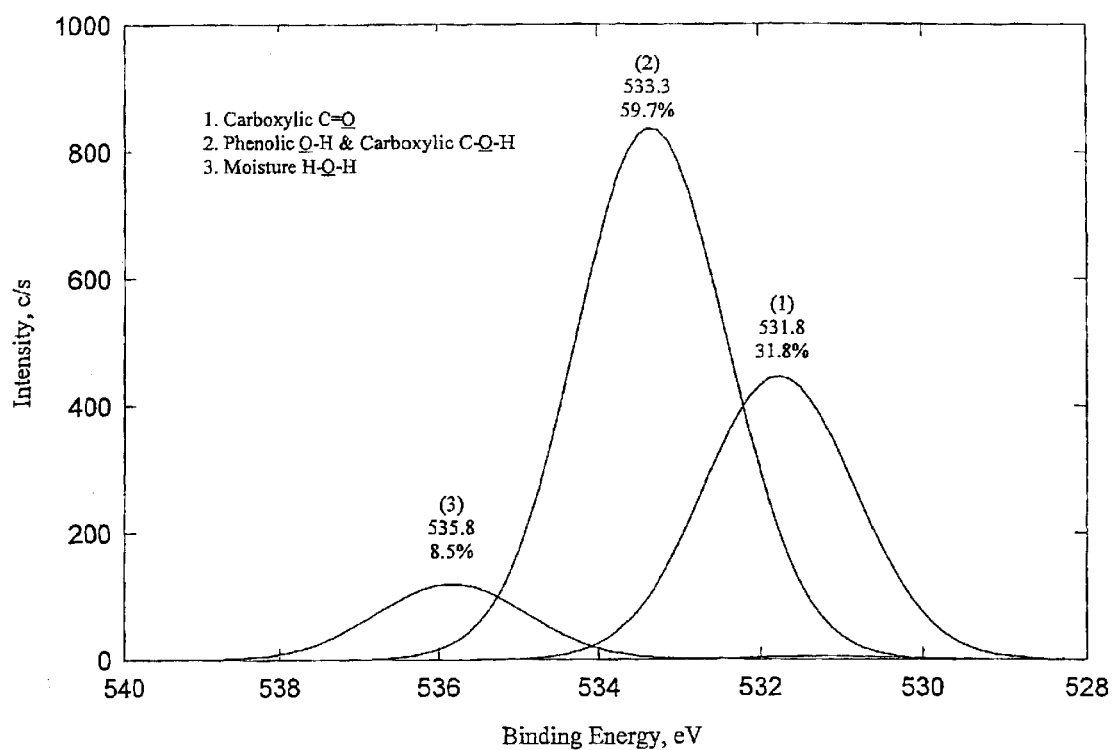
Figure 5 XPS of O1s Region in Succenoylated Raven 2500

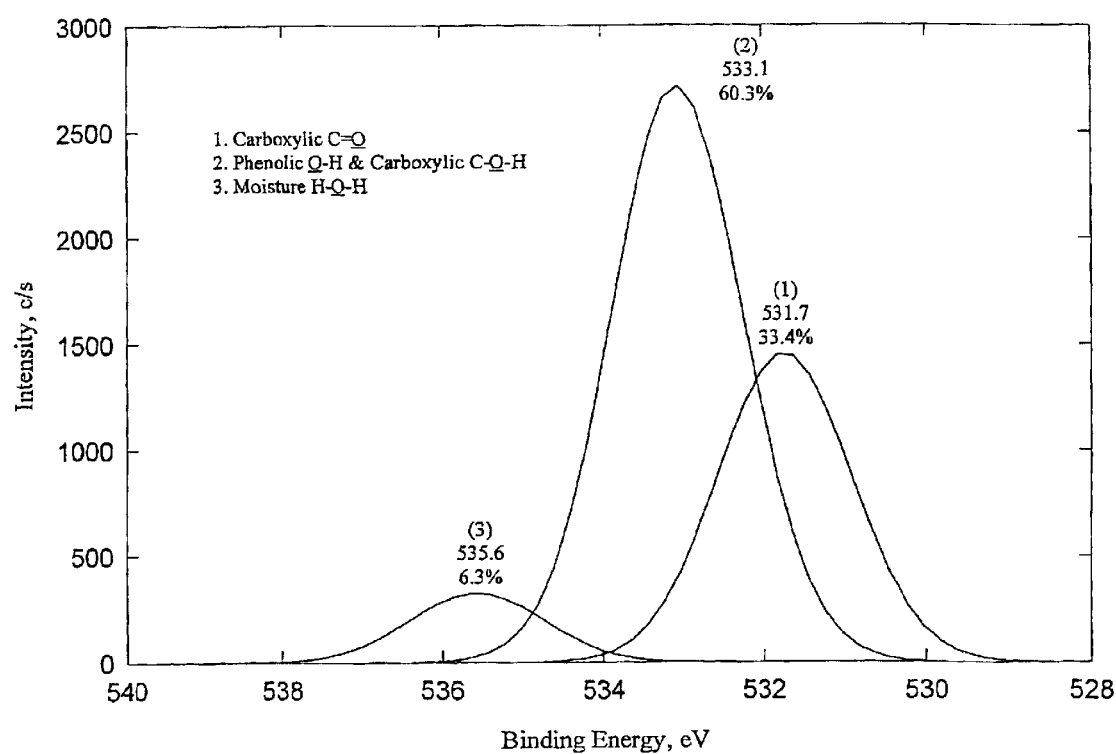
Figure 6 XPS of O1s Region in Phthaloylated Raven 2500

SURFACE MODIFICATION OF CARBONACEOUS MATERIALS BY INTRODUCTION OF GAMMA KETO CARBOXYL CONTAINING FUNCTIONAL GROUPS

FIELD OF THE INVENTION

The present invention relates to the surface modification of various carbonaceous materials and compounds. More specifically, the invention provides methods for the incorporation of gamma keto carboxyl containing functional groups onto the surface of carbonaceous materials and compounds and similarly provides several surface modified carbonaceous materials and compounds resulting therefrom.

BACKGROUND OF THE INVENTION

The surface modification of carbonaceous materials has been widely explored as a means for achieving desired chemical and physical properties not normally exhibited by carbonaceous materials and/or compounds. Recently, there has been a considerable interest in surface modification of carbonaceous materials for improved physicochemical properties in rubber, plastics, coatings and inks.

Traditionally, various additives, dispersants and surfactants were used to improve properties of carbonaceous materials, such as carbon black. However, these materials only provide marginal improvement in the desired properties and such additives can undesirably increase the viscosity of resulting dispersions. Moreover, these additives add significant costs and are therefore economically unfavorable as well. To this end, the concept of surface modification of carbonaceous materials by incorporating specific organic functional groups tends to achieve more desired results. For example, oxidation of carbon black generates surface active hydroxy and carboxylic sites. However, in the past, the concentration of these surface active sites has been very low, thus rendering the method ineffective for improving properties of the carbonaceous materials. As such, existing oxidation methods only provide marginal improvements in desired properties As an object of the present invention, a method has been developed to chemically bond aliphatic and aromatic carboxylate functional groups to inactive carbon black surface sites with a resulting high level of concentration. These carboxylate functionalities surface bonded thereto advantageously provide for a good interaction with substrates and therefore result in improved properties for use in rubber, plastics, coatings and ink applications.

SUMMARY OF THE INVENTION

Among other aspects, the present invention is based upon methods for the preparation of carbonaceous materials comprising a plurality of gamma keto carboxyl containing functional groups surface bonded thereto, and further provides several inventive surface modified carbonaceous materials resulting therefrom.

In a first aspect, the present invention provides a surface modified carbonaceous material, comprising a plurality of gamma keto carboxyl containing functional groups of the general formula —(CO)—$CR^1R^3$—$CR^2R^4$—(CO)OM surface bonded thereto, wherein $R^1$, $R^2$, $R^3$, and $R^4$ independently or collectively represent hydrogen, hydroxyl, amino, trimethyl amino, sulfonate, $C_1$–$C_{20}$ alkyl, $C_2$–$C_{20}$ alkenyl, $C_2$–$C_{20}$ alkynyl, $C_3$–$C_7$ cycloalkyl, $C_3$–$C_7$ cycloalkenyl, heterocycle, carbon-carbon bond, or aryl substituent, which substituents can be substituted or unsubstituted, and wherein M is a hydrogen or a cationic species. Additionally, any one or more combination of $R^1$ and $R^2$, $R^1$ and $R^4$, $R^3$ and $R^2$ or $R^3$ and $R^4$ can collectively represent a carbon-carbon bond, $C_1$–$C_{20}$ alkyl, $C_2$–$C_{20}$ alkenyl, $C_2$–$C_{20}$ alkynyl, $C_3$–$C_7$ cycloalkyl, $C_3$–$C_7$ cycloalkenyl, heterocycle, or aryl substituent, which substituent can be substituted or unsubstituted as well.

In a second aspect, the present invention also provides a process for the manufacture of a surface modified carbonaceous material comprising a plurality of gamma-keto-carboxyl containing functional groups surface bonded thereto. Accordingly, the process comprises the steps of introducing a carbonaceous material and an anhydride into a suitable solvent and then reacting the carbonaceous material with the anhydride under conditions effective to provide a surface modified carbonaceous material comprising a plurality of gamma-keto-carboxyl containing functional groups having the general formula —(CO)—$CR^1R^3$—$CR^2R^4$—(CO)—OH surface bonded thereto, wherein $R^1$, $R^2$, $R^3$, and $R^4$ independently or collectively represent hydrogen, hydroxyl, amino, trimethyl amino, sulfonate, $C_1$–$C_{20}$ alkyl, $C_2$–$C_{20}$ alkenyl, $C_2$–$C_{20}$ alkynyl, $C_3$–$C_7$ cycloalkyl, $C_3$–$C_7$ cycloalkenyl, heterocycle, carbon-carbon bond, or aryl substituent, which substituents can be substituted or unsubstituted.

In a third aspect, the invention provides products made from the processes of the invention.

In still a fourth aspect, the present invention further provides an aqueous composition, comprising the surface modified compounds, compositions and materials of the present invention and water.

Additional advantages of the invention will be obvious from the description, or may be learned by practice of the invention. Additional advantages of the invention will also be realized and attained by means of the elements and combinations particularly pointed out in the appended claims. Therefore, it is to be understood that both the foregoing general description and the following detailed description are exemplary and explanatory of certain embodiments of the invention, and are not restrictive of the invention as claimed.

BRIEF DESCRIPTION OF THE FIGURES

The appended Figures, which are incorporated in and constitute part of the specification, illustrate the effectiveness of the process of the present invention to provide a surface modified carbonaceous material having a plurality of gamma-keto-carboxylate functionalities surface bonded thereto.

FIG. 1 is a plot of the XPS spectrum of an unmodified carbon black compound (Raven 2500, manufactured by Columbian Chemical Company, Marietta, Ga., U.S.A.) indicating the cumulative percentage of surface concentration of oxygenic species.

FIG. 2 is a plot of the XPS spectrum indicating the cumulative percentage of surface concentration of oxygenic species present in a carbon black compound (Raven 2500, manufactured by Columbian Chemical Company, Marietta, Ga., U.S.A.) that has been surface modified with succinic anhydride.

FIG. 3 is a plot of the XPS spectrum indicating the cumulative percentage of surface concentration of oxygenic species present in a carbon black compound (Raven 2500, manufactured by Columbian Chemical Company, Marietta, Ga., U.S.A.) that has been surface modified with phthalic anhydride.

FIG. 4 is a plot of the XPS spectrum for the oxygen region measured in FIG. 1.

FIG. 5 is a plot of the XPS spectrum for the oxygen region measured in FIG. 2.

FIG. 6 is a plot of the XPS spectrum for the oxygen region measured in FIG. 3.

DETAILED DESCRIPTION OF THE INVENTION

The present invention may be understood more readily by reference to the following detailed description and any examples provided herein. It is also to be understood that this invention is not limited to the specific embodiments and methods described below, as specific components and/or conditions may, of course, vary. Furthermore, the terminology used herein is used only for the purpose of describing particular embodiments of the present invention and is not intended to be limiting in any way.

It must also be noted that, as used in the specification and the appended claims, the singular forms "a," "an," and "the" comprise plural referents unless the context clearly dictates otherwise. For example, reference to a component in the singular is intended to comprise a plurality of components.

Ranges may be expressed herein as from "about" or "approximately" one particular value and/or to "about" or "approximately" another particular value. When such a range is expressed, another embodiment comprises from the one particular value and/or to the other particular value. Similarly, when values are expressed as approximations, by use of the antecedent "about," it will be understood that the particular value forms another embodiment.

As used herein, a weight percent of a component, unless specifically stated to the contrary, is based on the total weight of the formulation or composition in which the component is included.

As used herein, the term "alkyl" refers to a paraffinic hydrocarbon group which may be derived from an alkane by dropping one hydrogen from the formula. Non-limiting examples include $C_1$–$C_{20}$ alkane derivatives such as methyl, ethyl, propyl, isopropyl, butyl, t-butyl, and isobutyl. To this end, it should be understood that an alkyl substituent suitable for use in the present invention can be a branched or straight chain alkyl substituent.

As used herein, the term "cycloalkyl" refers to a closed ring structure comprised of an alkyl derivative as defined above. Although larger structures are suitable with the present invention, a cycloalkyl substituent will preferably be a C3–C7 cycloalkyl ring.

As used herein, the term "alkenyl" is intended to refer to a substituent derived from the class of unsaturated hydrocarbons having one or more double bonds. Those containing only one double bond are referred to as alkenes or alkenyl substituents. Those with two or more double bonds are called alkadienes (alkadienyl), alkatrienes (alkatrienyl) and so on. Non-limiting examples include ethylene, propylene, butylene and the like. To this end, it should be understood that an alkenyl substituent suitable for use in the present invention can be substituted or unsubstituted.

As used herein, the term "cycloalkenyl" refers to a closed ring structure comprised of an alkenyl derivative as defined above. Although larger structures are suitable with the present invention, a cycloalkenyl substituent will preferably be a $C_3$–$C_7$ cycloalkenyl ring As used herein, the term "alkynyl" is intended to refer a substituent derived from the class of unsaturated hydrocarbons having one or more triple bonds.

As used herein, the term "cycloalkynyl" refers to a closed ring structure comprised of an alkynyl derivative as defined above. Although larger structures are suitable with the present invention, a cycloalkynyl substituent will preferably be a C3–C7 cycloalkynyl ring.

As used herein, the term "aryl" refers to a compound or substituent whose molecules have the ring structure characteristic of benzene, naphthalene, phenanthrene, anthracene, and the like. That is to say, an aryl group typically contains either the 6-carbon ring of benzene or the condensed 6 carbon rings of other aromatic derivatives. For example, an aryl group can be a phenyl or naphthyl group. To this end, it should be understood that aryl substituents suitable for use with the present invention can be substituted or unsubstituted.

As used herein, the term "heterocycle" refers to a closed ring substituent, preferably a 5 or 6 member ring, in which one or more of the atoms in the ring structure is an element other than carbon, e.g., sulfur, nitrogen, oxygen and the like. Examples of a heterocylce or heterocyclic substituent include, without limitation, thiophene, pyridine, pyrole, furan, and purine.

As used herein, the term "flocculation" refers to the combination or aggregation of suspended or dispersed particles in such a way that they form small clumps or agglomerates.

As used herein, the term "gamma-keto-carboxyl" refers to a functional substituent of the general formula: —(CO)—$CR^1R^3$—$CR^2R^4$—(CO)—OM wherein M is either hydrogen or a cationic species as defined herein. As used herein, substituents $R^1$, $R^2$, $R^3$, and $R^4$ can be independently selected from hydrogen, hydroxyl, amino, trimethyl amino, sulfonate, $C_1$–$C_{20}$ alkyl, $C_2$–$C_{20}$ alkenyl, $C_2$–$C_{20}$ alkynyl, $C_3$–$C_7$ cycloalkyl, $C_3$–$C_7$ cycloalkenyl, or heterocycle substituent. Additionally, any one or more combination of $R^1$ and $R^2$, $R^1$ and $R^4$, $R^3$ and $R^2$ or $R^3$ and $R^4$ can collectively represent a carbon-carbon bond, $C_1$–$C_{20}$ alkyl, $C_2$–$C_{20}$ alkenyl, $C_2$–$C_{20}$ alkynyl, $C_3$–$C_7$ cycloalkyl, $C_3$–$C_7$ cycloalkenyl, heterocycle, or aryl substituent, which substituent can be substituted or unsubstituted as well.

As used herein, the term "surface bonded" refers to a substituent that is substantially bonded, either covalently or ionically, only to the outer surface of the carbonaceous material particle. To this end, a substituent that is "surface bonded" is substantially absent from the inner region or core of the carbonaceous material particle.

As used herein, the term "cationic species" refers to a positively charged molecular or elemental species capable of forming an ionic bond with a carboxylate substituent. Although not required, it is preferred that the cationic species have a single positive charge. To this end, examples of cationic species suitable for use with the present invention include, without limitation, ammonium; organic bases such as dimethylethanol amine (DMEA) and triethanol amine (TEA); and the group (I) alkali metals, e.g., lithium, sodium, potassium, rubidium, cesium and francium. Alternatively, it will be understood that a cationic species with a positive charge greater that one will still work with the present invention but will bond or otherwise interact with a number of gamma-keto-carboxyl containing functional groups equal to its positive charge. That is to say, for example, the group (II) metals could also be used as suitable cationic species in the present invention, but it will be understood that a group (II) metal would interact with two gamma-keto-carboxyl containing functional groups.

As used herein, the phrase "group (I) metals" refers to the class of metals including lithium, sodium, potassium, rubidium, cesium and francium.

As used herein, the phrase "group (II) metals" refers to the class of metals including beryllium, magnesium, calcium, strontium, barium, and radium.

As used herein, the term "XPS" refers to X-ray Photoelectron Spectroscopy. Accordingly, all XPS measurements disclosed herein have been conducted using the Physical Electronics 5802 Multitechnique with Al Kα X-ray source.

As used herein, the term "carbonaceous material" is intended to include, without limitation, i) carbonaceous compounds having a single definable structure; or ii) aggregates of carbonaceous particles, wherein the aggregate does not necessarily have a unitary, repeating, and/or definable structure or degree of aggregation. For example, a carbon black material as used herein can be a carbon black compound having a definable structure or, alternatively, can also be an aggregate of carbonaceous particles wherein the exact structure or degree of aggregation is unknown.

As used herein, the term "optional" or "optionally" means that the subsequently described event or circumstance may or may not occur, and that the description includes instances where said event or circumstance occurs and instances where it does not. For example, the phrase "optionally substituted lower alkyl" means that the lower alkyl group may or may not be substituted and that the description includes both unsubstituted lower alkyl and lower alkyl where there is substitution.

As used herein, by use of the term "effective," "effective amount," or "conditions effective to" it is meant that such amount or reaction condition is capable of performing the function of the compound or property for which an effective amount is expressed. As will be pointed out below, the exact amount required will vary from one embodiment to another, depending on recognized variables such as the compounds employed and the processing conditions observed. Thus, it is not always possible to specify an exact "effective amount" or "condition effective to." However, it should be understood that an appropriate effective amount will be readily determined by one of ordinary skill in the art using only routine experimentation.

As initially set forth above, the present invention relates to methods for the manufacture of surface modified carbonaceous materials comprising a plurality of gamma-ketocarboxyl containing function groups surface bonded thereto, and similarly provides several surface modified carbonaceous materials resulting therefrom.

Accordingly, in a first aspect, the present invention provides a method comprising the steps of first introducing a carbonaceous material and a suitable anhydride into a suitable solvent. The carbonaceous material is then reacted with the anhydride under conditions effective to provide a surface modified carbonaceous material comprising a plurality of gamma-keto-carboxyl containing functional groups having the general formula —(CO)—$CR^1R^3$—$CR^2R^4$—(CO)—OH surface bonded thereto, wherein $R^1$, $R^2$, $R^3$, and $R^4$ can be independently selected from hydrogen, hydroxyl, amino, trimethyl amino, sulfonate, $C_1$–$C_{20}$ alkyl, $C_2$–$C_{20}$ alkenyl, $C_2$–$C_{20}$ alkynyl, $C_3$–$C_7$ cycloalkyl, $C_3$–$C_7$ cycloalkenyl, or heterocycle substituent. Additionally, any one or more combination of $R^1$ and $R^2$, $R^1$ and $R^4$, $R^3$ and $R^2$ or $R^3$ and $R^4$ can collectively represent a carbon-carbon bond, $C_1$–$C_{20}$ alkyl, $C_2$–$C_{20}$ alkenyl, $C_2$–$C_{20}$ alkynyl, $C_3$–$C_7$ cycloalkyl, $C_3$–$C_7$ cycloalkenyl, heterocycle, or aryl substituent, which substituent can be substituted or unsubstituted as well.

The process of the present invention can be used with a variety of carbonaceous materials. To this end, any carbonaceous compound or material can be used provided there are sufficient reactive edge sites capable of interacting with the suitable anhydride component under conditions effective to provide a desired surface modified carbonaceous material. Although not required, it is preferred that the carbonaceous material have a surface area of at least approximately 25 $m^2$/g as measured by ASTM-D4820. In a more preferred embodiment, when measured by ASTM-D4820, the carbonaceous material will have a surface area of at least approximately 100 $m^2$/g. In still a more preferred embodiment, the surface area of the carbonaceous material will be greater than approximately 200 $m^2$/g when measured according to the ASTM-D4820 method.

Specific examples of suitable carbonaceous materials include, without limitation, carbon fiber, activated charcoal, finely divided carbon, carbon black, graphite, fullerinic carbons, and nanocarbons. In a preferred embodiment, the carbonaceous material is a carbon black having a surface area greater than approximately 200 $m^2$/g and an oil adsorption rate of at least 60 ml/100 g as measured by ASTM-D2414.

Solvents that can be used with the present invention include any organic solvent known to one of ordinary skill in the art as suitable for use in a Friedel-Crafts acylation reaction. To this end, preferred examples include, without limitation, dimethylacetamide, dimethylsulfoxide and dimethylformamide.

Anhydrides that can be used in the process of the present invention include any organic anhydride suitable for use in a Friedel-Crafts acylation reaction. To this end, the anhydride can be either an aromatic or an aliphatic anhydride.

In one embodiment, a preferred anhydride suitable for use with the process includes, without limitation, a succinic anhydride of the general formula:

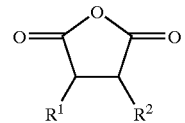

In accordance with this embodiment, $R^1$ and $R^2$ are independently selected from hydrogen, hydroxyl, amino, trimethyl amino, sulfonate, $C_1$–$C_{20}$ alkyl, $C_1$–$C_{20}$ alkenyl, $C_1$–$C_{20}$ alkynyl, $C_3$–$C_7$ cycloalkyl, $C_3$–$C_7$ cycloalkenyl, or heterocycle substituent. Additionally, where applicable, substituents $R^1$ and $R^2$ can be substituted or unsubstituted as well.

When the process of the present invention is carried out with a succinic anhydride as set forth above, the resulting surface bonded gamma-keto-carboxyl containing functional group will be a succinic acid derivative having the general formula:

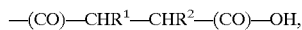

wherein $R^1$ and $R^2$ are independently selected from hydrogen, hydroxyl, amino, trimethyl amino, sulfonate, $C_1$–$C_{20}$ alkyl, $C_1$–$C_{20}$ alkenyl, $C_1$–$C_{20}$ alkynyl, $C_3$–$C_7$ cycloalkyl, $C_3$–$C_7$ cycloalkenyl, or heterocycle substituent, and wherein $R^1$ and $R^2$ the substituents can be substituted or unsubstituted. To this end, in a preferred embodiment, $R^1$ and $R^2$ each independently represent hydrogen atoms.

In another embodiment, a preferred anhydride suitable for use with the process includes, without limitation, a maleic anhydride of the general formula:

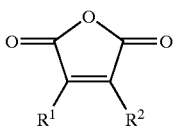

In accordance with this embodiment, $R^1$ and $R^2$ are independently selected from hydrogen, hydroxyl, amino, trimethyl amino, sulfonate, $C_1$–$C_{20}$ alkyl, $C_1$–$C_{20}$ alkenyl, $C_1$–$C_{20}$ alkynyl, $C_3$–$C_7$ cycloalkyl, $C_3$–$C_7$ cycloalkenyl, or heterocycle substituent. Additionally, where applicable, substituents $R^1$ and $R^2$ can be substituted or unsubstituted as well.

When the process of the present invention is carried out with a maleic anhydride as set forth above, the resulting surface bonded gamma-keto-carboxyl containing functional group will be a maleic acid derivative having the general formula:

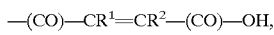
—(CO)—$CR^1$=$CR^2$—(CO)—OH, wherein $R^1$ and $R^2$ are independently selected from hydrogen, hydroxyl, amino, trimethyl amino, sulfonate, $C_1$–$C_{20}$ alkyl, $C_1$–$C_{20}$ alkenyl, $C_1$–$C_{20}$ alkynyl, $C_3$–$C_7$ cycloalkyl, $C_3$–$C_7$ cycloalkenyl, or heterocycle substituent, and wherein $R^1$ and $R^2$ the substituents can be substituted or unsubstituted. To this end, in a preferred embodiment, $R^1$ and $R^2$ each independently represent hydrogen atoms.

In still Another embodiment, a preferred anhydride suitable for use with the process includes, without limitation, a phthalic anhydride of the general formula:

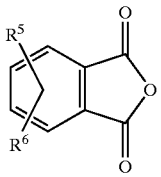

In accordance with this embodiment, $R^5$ and $R^6$ can be positioned on any carbon within the six member ring and are independently selected from hydrogen, hydroxyl, amino, trimethyl amino, sulfonate, $C_1$–$C_{20}$ alkyl, $C_1$–$C_{20}$ alkenyl, $C_1$–$C_{20}$ alkynyl, $C_3$–$C_7$ cycloalkyl, $C_3$–$C_7$ cycloalkenyl, or heterocycle substituent. Additionally, where applicable, substituents $R^5$ and $R^6$ can be substituted or unsubstituted as well.

When a phthalic anhydride, as set forth above, is used with the process of the present invention, the resulting gamma-keto-carboxyl containing function group surface bonded to the carbonaceous material will have the general structure:

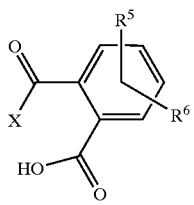

wherein "X" represents the carbonaceous material. In addition, as described above, $R^5$ and $R^6$ can again be positioned on any carbon within the six member ring and independently selected from hydrogen, hydroxyl, amino, trimethyl amino, sulfonate, $C_1$–$C_{20}$ alkyl, $C_1$–$C_{20}$ alkenyl, $C_1$–$C_{20}$ alkynyl, $C_3$–$C_7$ cycloalkyl, $C_3$–$C_7$ cycloalkenyl, or heterocycle substituent. Also, where applicable, substituents $R^5$ and $R^6$ can again be substituted or unsubstituted as well. To this end, in a preferred embodiment, $R^5$ and $R^6$ both represent hydrogen atoms.

It will be appreciated that the optimum reaction conditions for performing the process of the present invention will, of course, vary depending on the particular anhydride, solvent, and/or the particular carbonaceous material selected to be surface modified. To this end, arriving at such optimum conditions would be readily obtainable by one of ordinary skill in the art or otherwise can be obtained through no more than routine experimentation.

In one embodiment, the reaction conditions can further comprise the presence of a suitable catalyst. To this end, any catalyst that is known for use with a Friedel-Crafts acylation reaction may be used in the process of the present invention. However, in a preferred embodiment, the catalyst is anhydrous aluminum chloride or ferric chloride. Furthermore, when used, the preferred amount of catalyst relative to the amount of anhydride in the reaction mixture should a molar ratio in the range of from approximately 0.8M to approximately 1.2M. In still a more preferred embodiment, the molar ratio of catalyst to the anhydride is approximately 1:1 or equimolar.

According to the invention, any amount of carbonaceous compound can be used provided it is present in adequate proportion to the solvent, catalyst and anhydride in order to react accordingly. To this end, in a preferred embodiment, the carbonaceous compound or material to be surface modified is mixed with a suitable solvent such that the amount of carbonaceous compound relative to the solvent is a weight ratio in the range of from approximately 1:2 to approximately 1:3.

Likewise, any amount of anhydride can be used in the reaction provided it too is present in an adequate amount relative to the carbonaceous material so that the reaction will proceed. To this end, in a preferred embodiment, the amount of anhydride introduced in to the reaction, relative to the amount of carbonaceous material is a weight ratio of at least approximately 1:10.

Once the reaction mixture has been prepared, the reaction is allowed to proceed at room temperature for approximately 2 hours. It is understood that the reaction occurs relatively fast and therefore would likely be complete prior to the completion of the 2 hour reaction time, however, it is also appreciated that by allowing the mixture to react for a period of time in excess of the actual reaction time merely helps to ensure substantial completion of the reaction.

In another aspect of the present invention, it may be desired, although not required, to further treat the surface modified carbonaceous materials as set forth above, with a neutralizing agent in order to provide a surface modified carbonaceous material or compound comprising a plurality of gamma-keto-carboxyl containing functional groups having the general formula —(CO)—$CR^1R^3$—$CR^2R^4$—(CO)—OM surface bonded thereto, wherein M is a cationic species as defined herein and wherein $R^1$, $R^2$, $R^3$, and $R^4$ can be independently selected from hydrogen, hydroxyl, amino, trimethyl amino, sulfonate, $C_1$–$C_{20}$ alkyl, $C_2$–$C_{20}$ alkenyl, $C_2$–$C_{20}$ alkynyl, $C_3$–$C_7$ cycloalkyl, $C_3$–$C_7$ cycloalkenyl, or heterocycle substituent. Additionally, any one or more combination of $R^1$ and $R^2$, $R^1$ and $R^4$, $R^3$ and $R^2$ or $R^3$ and $R^4$ can collectively represent a carbon-carbon bond, $C_1$–$C_{20}$ alkyl, $C_2$–$C_{20}$ alkenyl, $C_2$–$C_{20}$ alkynyl, $C_3$–$C_7$ cycloalkyl, $C_3$–$C_7$ cycloalkenyl, heterocycle, or aryl substituent, which substituent can be substituted or unsubstituted as well.

Suitable neutralizing agents include, without limitation, alkali hydroxides, such as sodium hydroxide, potassium hydroxide, lithium hydroxide, ammonium hydroxide; alkali carbonates and bicarbonates, such as sodium bicarbonate, potassium bicarbonate, and the like; as well as organic bases such, as dimethylethanol amine and triethanol amine. Although any commercially available neutralizing agent and concentration thereof will suffice, the neutralizing agent is preferably a 0.5M, 0.75M, 1M, 1.25M or 1.5M solution of sodium hydroxide.

To this end, the chemistry and conditions required for neutralization of the gamma-keto carboxylate substituents would be readily known to one of ordinary skill and need not be discussed at length herein. Therefore, it will be appreciated that arriving at the optimum process conditions for achieving the desired degree and kind of neutralization will require no more than routine experimentation. However, in a preferred embodiment, the neutralizing agent is used in an amount and strength sufficient to provide a resulting pH of at least 8.

At this point, it should also be understood that, if desired, the resulting surface modified carbonaceous material, either before or after the optional neutralization step, can be washed with distilled water, filtered and/or dried in order to obtain substantially purified and/or isolated surface modified product.

In an alternative aspect, the present invention also provides for several surface modified carbonaceous materials that result from the aforementioned process. To this end, it will be appreciated upon practicing the present invention that the surface modified carbonaceous materials resulting therefrom exhibit several advantageously improved characteristics over those previously obtained in the art.

Accordingly, in one embodiment, the invention provides a surface modified carbonaceous material comprising a plurality of gamma-keto-carboxyl substituents of the general formula —(CO)—CR$^1$R$^3$—CR$^2$R$^4$—(CO)OM surface bonded thereto, wherein M is hydrogen or a cationic species as defined herein, and wherein R$^1$, R$^2$, R$^3$, and R$^4$ can be independently selected from hydrogen, hydroxyl, amino, trimethyl amino, sulfonate, C$_1$–C$_{20}$ alkyl, C$_2$–C$_{20}$ alkenyl, C$_2$–C$_{20}$ alkynyl, C$_3$–C$_7$ cycloalkyl, C$_3$–C$_7$ cycloalkenyl, or heterocycle substituent. Additionally, any one or more combination of R$^1$ and R$^2$, R$^1$ and R$^4$, R$^3$ and R$^2$ or R$^3$ and R$^4$ can collectively represent a carbon—carbon bond, C$_1$–C$_{20}$ alkyl, C$_2$–C$_{20}$ alkenyl, C$_2$–C$_{20}$ alkynyl, C$_3$–C$_7$ cycloalkyl, C$_3$–C$_7$ cycloalkenyl, heterocycle, or aryl substituent, which substituent can be substituted or unsubstituted as well.

For example, in one embodiment, the gamma-keto-carboxyl containing functional group is derived from a maleic anhydride such that R3 and R4 collectively represent a carbon-carbon bond and such that the gamma-keto functional group has the general formula:

—(CO)—CR$^1$=CR$^2$—(CO)—OM, wherein R$^1$ and R$^2$ are independently selected from hydrogen, hydroxyl, amino, trimethyl amino, sulfonate, C$_1$–C$_{20}$ alkyl, C$_1$–C$_{20}$ alkenyl, C$_1$–C$_{20}$ alkynyl, C$_3$–C$_7$ cycloalkyl, C$_3$–C$_7$ cycloalkenyl, or heterocycle substituent, and wherein the substituents can be substituted or unsubstituted. In accordance with this embodiment, R$^1$ and R$^2$ are preferably each hydrogen.

In an alternative embodiment, the gamma keto carboxyl containing functional group is derived from a succinic anhydride such that R3 and R4 each independently represent hydrogen and such that the gamma-keto functional group has the general formula:

—(CO)—CHR$^1$—CHR$^2$—(CO)—OM, wherein R$^1$ and R$^2$ are independently selected from hydrogen, hydroxyl, amino, trimethyl amino, sulfonate, C$_1$–C$_{20}$ alkyl, C$_1$–C$_{20}$ alkenyl, C$_1$–C$_{20}$ alkynyl, C$_3$–C$_7$ cycloalkyl, C$_3$–C$_7$ cycloalkenyl, or heterocycle substituent, and wherein the substituents can be substituted or unsubstituted. Once again, in accordance with this embodiment, R$^1$ and R$^2$ are each preferably hydrogen.

In still another embodiment, the surface bonded gamma-keto-carboxyl containing functional group is derived from a phthalic anhydride such that R$^1$, R$^3$, R$^2$, and R$^4$ collectively represent an aryl substituent and such that the gamma-keto functional group has the general formula:

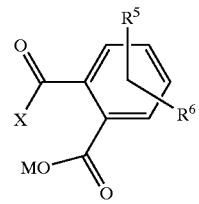

wherein "X" represents the carbonaceous material, wherein R$^5$ and R$^6$ can be positioned on any carbon within the six member ring and are independently selected from hydrogen, hydroxyl, amino, trimethyl amino, sulfonate, C$_1$–C$_{20}$ alkyl, C$_1$–C$_{20}$ alkenyl, C$_1$–C$_{20}$ alkynyl, C$_3$–C$_7$ cycloalkyl, C$_3$–C$_7$ cycloalkenyl, or heterocycle substituent, and wherein the substituents can be substituted or unsubstituted. Once again, similar to the previously described embodiments, R$^5$ and R$^6$ are preferably each hydrogen.

As with the process aspects described above, the carbonaceous compound or material can again be any carbonaceous material or compound provided it contains sufficient C—H edge sites capable of interacting with a suitable anhydride under conditions effective to provide a desired surface modified carbonaceous material having a plurality of surface bonded gamma-keto-carboxyl functionalities.

Accordingly, it is preferred that the carbonaceous material have a surface area of at least approximately 25 m$^2$/g as measured by ASTM-D4820. In a more preferred embodiment, when measured by ASTM-D4820, the carbonaceous material will have a surface area of at least approximately 100 m$^2$/g. In still a more preferred embodiment, the surface area of the carbonaceous material will be greater than approximately 200 m$^2$/g when measured according to the ASTM-D4820 method.

Specific examples of suitable carbonaceous materials again include, without limitation, carbon fiber, activated charcoal, finely divided carbon, carbon black, graphite, fullerinic carbons, and nanocarbons. In a preferred embodiment, the carbonaceous material is a carbon black having a surface area greater than approximately 200 m$^2$/g and an oil adsorption rate of at least 60 ml/100 g as measured by ASTM-D2414.

According to the invention, the degree of surface modification or level of gamma-keto-carboxyl substitution can be measured by XPS (X-ray Photoelectron Spectroscopy). More specifically, XPS can be used to measure the surface atomic concentration of oxygen species surface bonded to a carbonaceous material prior to the surface modification process of the present invention and as well as after surface modification. To that end, the gamma-keto surface modified carbonaceous materials of the present invention preferably have a surface atomic concentration of oxygen surface bonded thereto greater than at least approximately 1.5%. In a more preferred embodiment, the surface atomic concentration of oxygen surface bonded thereto is greater than at least approximately 2%, 3%, 4%, 5%, 6%, 7% or even 8%. It is understood however, that the level of surface modification or substitution achieved will ultimately be dependent on a number of variables, including the surface area of the initial carbonaceous material. That is to say, the level of surface modification will typically increase relative to an increase in the initial surface area of the carbonaceous material.

For example, with specific reference to the figures, FIG. 1 illustrates the surface atomic concentration of the carbon black used to prepare the surface modified carbonaceous material of example 1. As illustrated, the surface atomic concentration of oxygen is approximately 1.2% prior to incorporation of the surface bonded gamma-keto-carboxyl functional groups of the present invention. Similarly, FIG. 4 further illustrates the relative distribution and types of those oxygen species surface bonded to the unmodified carbon black of Example 1.

Turning now to FIG. 2, it is shown that the surface atomic concentration of oxygen surface bonded to the modified carbonaceous material prepared in Example 1 is approximately 8.0%. Furthermore, FIG. 5 also illustrates the relative distribution and types of those oxygen species surface bonded to the carbonaceous material of Example 1 as a result of the surface bonded gamma-keto-carboxyl containing functional groups.

Finally, FIG. 3 further illustrates that the surface atomic concentration of oxygen surface bonded to the modified carbonaceous material prepared in Example 2 is approximately 8.3%. Furthermore, FIG. 6 also illustrates the relative distribution and types of those oxygen species surface bonded to the carbonaceous material of Example 2 as a result of the surface bonded gamma-keto-carboxyl containing functional groups.

Among the several advantages that are obtained by practicing the present invention, the surface modified carbonaceous materials of the present invention exhibit an improved storage stability and dispersibility in aqueous and waterborne formulations. Specifically, when tested after storage periods of at least one week, one month and even three months, an aqueous dispersion containing the surface modified compounds of the present invention will exhibit substantially no visible flocculation.

Likewise, after similar storage periods of at least one week, one month and even three months, an aqueous dispersion of a surface modified carbonaceous material as described herein will advantageously pass through a filter having a mesh size in the range of from approximately 8 microns to approximately 10 microns, such as a Whatman #42 filter paper, leaving substantially no visible particulate residue.

Accordingly, these and other advantageous properties of the surface modified compounds described herein facilitate their viability in several aqueous formulations. As such, in still another aspect, the present invention further provides several end use formulations for the surface modified carbonaceous materials set forth above.

To this end, the present invention also provides an aqueous composition comprising a surface modified carbonaceous material as set forth above and water. The self dispersibility and long term stability of a surface modified carbon black according to the present invention is particularly suited for this embodiment as it can be used to provide a waterborne ink formulation suitable for use in, among other applications, inks and in particular, ink jet printing and recording technology.

To this end, when an ink dispersion is used in ink jet applications, it is necessary to eject the ink in the form of stable droplets through a minute orifice in the ink jet printing head or device. Therefore, it is very important that the ink formulation, and the pigment dispersion contained therein, remain dispersed and stable so as not to flocculate and potentially clog the orifice. Advantageously, the self-dispersing surface modified carbonaceous materials of the present invention remain stable indefinitely when dispersed in waterborne systems. Additionally, these aqueous dispersions do not require the use of additional dispersing agents to remain stable, which may undesirably increase the viscosity of such a formulation.

When the surface modified compounds, compositions and materials of the present invention are utilized in an aqueous dispersion, the surface modified carbonaceous material, e.g., carbon black, can surprisingly be present in an amount of from approximately 1 wt % to approximately 40 wt. % relative to the entire aqueous dispersion. In a preferred embodiment, the dispersion can comprise in the range of from approximately 10 wt. % to approximately 40 wt. % of the gamma-keto surface modified carbon black. Furthermore, as indicated above, the aqueous dispersion advantageously remains stable indefinitely, exhibiting substantially no visual flocculation.

Likewise, an aqueous dispersion according to these embodiments can comprise water in the range of from at least approximately 10% to approximately 99% by weight of the aqueous dispersion.

If desired, aqueous dispersions and formulations comprising the surface modified carbonaceous materials of the present invention can further comprise one or more humectants selected from ethylene glycol, diethylene glycol, propylene glycol, dipropylene glycol, polyethylene glycol, polypropylene glycol, alcohol derivatives such as ethanol, propanol, isopropanol and the like, and cellosolve. It will be appreciated that the humectant is optionally introduced as a means to maintain a substantially constant moisture content of the aqueous dispersions and formulations.

Additionally, a waterborne formulation or dispersion according to the present invention can optionally contain one or more additional additives such as a polymer binder; e.g., Joncryl J-61 (Acrylic polymer, manufacture and available from S. C. Johnson Wax.), surfactants such as Surfynol 695 or Surfynol 7608 (manufactured by Air Products, Allentown, Pa.) and one or more biocide compositions.

To this end, the polymer binder acts as a film forming component allowing a formulation such as an aqueous ink, to have substantial fastness and staying potential thus allowing the ink to bind to the medium once water and other optional solvents have evaporated.

Additionally, the incorporation of an optional biocide component may also be desired in order to control and/or prevent the potential growth of algae and other microorganisms, which are typically prone to develop in an aqueous system or formulation.

It will be appreciated that the aqueous dispersions comprising the surface modified carbonaceous materials of the present invention can be prepared using any milling or dispersing machine known to one of ordinary skill in the art, including without limitation, shear stress machines such as a two or three roll mill, machines which disperse pigment particles with impact strength caused by the collision between media such as glass beads, zirconia beads, steel beads, agate beads, such as a ball mill or pearl mill, or even with machines that finely disperse pigment particles with a collision force or a shear stress among the pigment particles or between the pigment particles and a vehicle or a wall surface, such as a kneader or an extruder.

EXAMPLES

The following examples are put forth so as to provide those of ordinary skill in the art with a complete disclosure and description of how the compounds, compositions, articles, devices and/or methods claimed herein are made and evaluated, and are intended to be purely exemplary of the invention and are not intended to limit the scope of what the inventors regard as their invention. Efforts have been made to ensure accuracy with respect to numbers (e.g., amounts, temperature, etc.); however, some errors and deviations may have occurred. Unless indicated otherwise, parts are parts by weight, temperature is degrees C. or is at ambient temperature, and pressure is at or near atmospheric.

The amount or property of a compound as provided herein means such amount as that capable of performing the function of the compound or property for which an amount is expressed. As will be pointed out below, the exact amount required will vary from process to process, depending on recognized variables such as the compounds employed and the processing conditions observed. However, an appropriate amount may be determined by one of ordinary skill in the art using only routine experimentation.

Example 1

Surface Modification of Carbon Black with Succinic Anhydride 100 grams of Carbon Black (Raven 2500 Ultra, manufactured by Columbian Chemical Company, Marietta, Ga., U.S.A.) having a surface area of 270 m$^2$/g as measured by ASTM-D4820 and an oil absorption of 67 ml/100 g as measured by ASTM-D2414, was added to a 3 necked flask containing 250 mL of dimethyl acetamide. A solution of 10 grams succinic anhydride and 13.4 grams of anhydrous aluminum chloride in 50 mL of dimethyl acetamide was added to the carbon black/dimethyl acetamide slurry while continuously stirring the ensuing mixture. The reaction mixture was then stirred for an additional 2 hours at room or ambient temperature. The resulting surface modified carbonaceous material was then filtered and washed with distilled water.

After the initial filtration and washing, the surface modified carbon black was then redissolved in 300 mL of distilled water and neutralized with 1M sodium hydroxide solution. Once again, this resulting slurry was filtered, and then dried at approximately 110° C. The final product contained a plurality of surface bonded gamma-keto-carboxyl functionalities of the general formula:

—(CO)—CH$_2$—CH$_2$—(CO)—ONa.

Example 2

Surface Modification of Carbon Black with Phthalic Anhydride 100 grams of Carbon Black (Raven 2500 Ultra, manufactured by Columbian Chemical Company, Marietta, Ga., U.S.A.) having a surface area of 270 m$^2$/g as measured by ASTM-D4820 and an oil absorption of 67 ml/100 g as measured by ASTM-D2414, was added to a 3 necked flask containing 250 mL of dimethyl acetamide. A solution of 15 grams phthalic anhydride and 13.4 grams of anhydrous aluminum chloride in 50 mL of dimethyl acetamide was added to the carbon black/dimethyl acetamide slurry while continuously stirring the ensuing mixture. The reaction mixture was then stirred for an additional 2 hours at room or ambient temperature. The resulting surface modified carbonaceous material was then filtered and washed with distilled water.

After the initial filtration and washing, the surface modified carbon black was then redissolved in 300 mL of distilled water and neutralized with 1M sodium hydroxide solution. Once again, this resulting slurry was filtered, and then dried at approximately 110° C. The final product contained a plurality of surface bonded gamma-keto-carboxyl functionalities of the general formula:

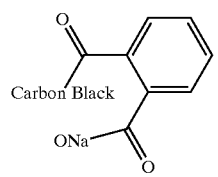

Example 3

Sample Waterborne Dispersion Formulation

A sample waterborne dispersion formulation for use in an aqueous flexographic printing system would be prepared using a surface modified carbon black as prepared in Example 1. The formulation would comprise:

| | |
|---|---|
| Water: | 20.4 wt % |
| Isopropyl Alcohol: | 3.7 wt. % |
| Sulfonated Carbon Black of Example. 1: | 14.8 wt. % |
| Joncryl J-61 (Acrylic polymer, obtained from S. C. Johnson Wax) | 61.1 wt. % |

Example 4

Sample Ink Jet Formulation

A sample ink jet formulation for use in an ink jet printing system would be prepared using a surface modified carbon black as prepared in Example 1. The formulation would comprise:

| | |
|---|---|
| Water | 73.55 wt. % |
| Glycerol | 8.00 wt. % |
| Diethylene Glycol | 10.00 wt. % |
| Surfynol 695 (Obtained from Air Products, Allentown, Pennsylvania) | 3.00 wt. % |
| Surfynol 7608 (Obtained from Air Products, Allentown, Pennsylvania) | 2.50 wt. % |
| Surface Modified Carbon Black of Ex. 1 | 2.75 wt. % |
| Biocide | 0.20 wt. % |

Throughout this application, where various publications are referenced, the entire disclosures of these publications are hereby incorporated by reference into this application for all purposes.

While this invention has been described in connection with preferred embodiments and specific examples, it is not intended to limit the scope of the invention to the particular embodiments set forth, but on the contrary, it is intended to cover such alternatives, modifications, and equivalents as may be included within the spirit and scope of the invention as defined by the appended claims. For example, there are numerous variations and combinations of components and or conditions, e.g., the carbonaceous material, solvent, anhydride, reaction conditions and the like that can be used to optimize the results obtained from the described embodiments. To this end, one skilled in the art will appreciate that in practicing the present invention, only reasonable and routine experimentation will be required to optimize such conditions.

What is claimed is:

1. A surface modified carbonaceous material, comprising a plurality of gamma keto carboxyl containing functional groups of the general formula —(CO)—$CR^1R^3$—$CR^2R^4$—(CO)OM surface bonded thereto, wherein $R^1$, $R^2$, $R^3$, and $R^4$ independently or collectively represent hydrogen, hydroxyl, amino, trimethyl amino, sulfonate, $C_1$–$C_{20}$ alkyl, $C_2$–$C_{20}$ alkenyl, $C_2$–$C_{20}$ alkynyl, $C_3$–$C_7$ cycloalkyl, $C_3$–$C_7$ cycloalkenyl, heterocycle, carbon-carbon bond, or aryl substituent, wherein the substituents can be substituted or unsubstituted, and wherein M is a hydrogen or a cationic species.

2. The material of claim 1, wherein the carbonaceous material is carbon fiber, carbon black, graphite, finely divided carbon, activated charcoal, fullerinic carbon, or nanocarbon.

3. The material of claim 1, wherein the gamma keto carboxyl containing functional group is a maleic acid derivative having the general formula:

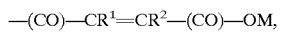

—(CO)—$CR^1$=$CR^2$—(CO)—OM, wherein $R^1$ and $R^2$ are independently selected from hydrogen, hydroxyl, amino, trimethyl amino, sulfonate, $C_1$–$C_{20}$ alkyl, $C_1$–$C_{20}$ alkenyl, $C_1$–$C_{20}$ alkynyl, $C_3$–$C_7$ cycloalkyl, $C_3$–$C_7$ cycloalkenyl, or heterocycle substituent, wherein the substituents can be substituted or unsubstituted.

4. The material of claim 1, wherein the gamma keto carboxyl containing functional group is a succinic acid derivative having the general formula:

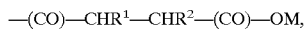

—(CO)—$CHR^1$—$CHR^2$—(CO)—OM, wherein $R^1$ and $R^2$ are independently selected from hydrogen, hydroxyl, amino, trimethyl amino, sulfonate, $C_1$–$C_{20}$ alkyl, $C_1$–$C_{20}$ alkenyl, $C_1$–$C_{20}$ alkynyl, $C_3$–$C_7$ cycloalkyl, $C_3$–$C_7$ cycloalkenyl, or heterocycle substituent, wherein the substituents can be substituted or unsubstituted.

5. The material of claim 3, wherein $R^1$ and $R^2$ are hydrogen.

6. The material of claim 4, wherein $R^1$ and $R^2$ are hydrogen.

7. The material of claim 1, wherein the surface bonded gamma keto carboxyl containing functional group is a phthalic acid derivative having the general formula:

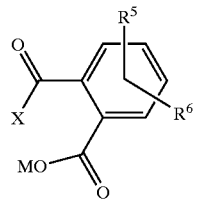

wherein "X" represents the carbonaceous material, wherein $R^5$ and $R^6$ can be independently positioned on any carbon within the six member ring and are independently selected from hydrogen, hydroxyl, amino, trimethyl amino, sulfonate, $C_1$–$C_{20}$ alkyl, $C_1$–$C_{20}$ alkenyl, $C_1$–$C_{20}$ alkynyl, $C_3$–$C_7$ cycloalkyl, $C_3$–$C_7$ cycloalkenyl, or heterocycle substituent, and wherein the substituents can be substituted or unsubstituted.

8. The material of claim 7, wherein $R^5$ and $R^6$ are hydrogen.

9. The material of claim 1 having a surface area of at least approximately 200 m2/g.

10. The material of claim 1, wherein the carbonaceous material is carbon black.

11. The material of claim 1, wherein the cationic species is selected from the group consisting of sodium, lithium, ammonium and potassium.

12. The material of claim 1, wherein M is sodium.

13. The material of claim 1, wherein the material exhibits substantially no vissible flocculation when dispersed in an aqueous medium after a period of at least approximately three months.

14. A process for the manufacture of a surface modified carbonaceous material comprising a plurality of gamma-keto-carboxyl containing functional groups surface bonded thereto, comprising the steps of:

a) introducing a carbonaceous material and an anhydride into a suitable solvent; and b) reacting the carbonaceous material with the anhydride under conditions effective to provide a surface modified carbonaceous material comprising a plurality of gamma-keto-carboxyl containing functional groups having the general formula —(CO)—$CR^1R^3$—$CR^2R^4$—(CO)—OH surface bonded thereto, wherein $R^1$, $R^2$, $R^3$, and $R^4$ independently or collectively represent hydrogen, hydroxyl, amino, trimethyl amino, sulfonate, $C_1$–$C_{20}$ alkyl, $C_2$–$C_{20}$ alkenyl, $C_2$–$C_{20}$ alkynyl, $C_3$–$C_7$ cycloalkyl, $C_3$–$C_7$ cycloalkenyl, heterocycle, carbon-carbon bond, or aryl substituent, wherein the substituents can be substituted or unsubstituted.

15. The process of claim 14, wherein the carbonaceous material is carbon fiber, carbon black, graphite, finely divided carbon, activated charcoal, fullerinic carbon or nanocarbon.

16. The process of claim 14, wherein the carbonaceous material is carbon black.

17. The process of claim 14, wherein the anhydride is a succinic anhydride of the general formula:

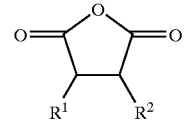

wherein $R^1$ is a hydrogen, hydroxyl, amino, trimethyl amino, sulfonate, $C_1$–$C_{20}$ alkyl, $C_1$–$C_{20}$ alkenyl, $C_1$–$C_{20}$ alkynyl, $C_3$–$C_7$ cycloalkyl, $C_3$–$C_7$ cycloalkenyl, or heterocycle substituent, wherein the substituents can be substituted or unsubstituted.

18. The process of claim 17, wherein $R^1$ and $R^2$ are hydrogen.

19. The process of claim 14, wherein the anhydride is phthalic anhydride of the general formula:

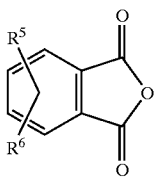

wherein $R^5$ and $R^6$ can be independently positioned on any carbon within the six member ring and are independently selected from hydrogen, hydroxyl, amino, trimethyl amino, sulfonate, $C_1$–$C_{20}$ alkyl, $C_1$–$C_{20}$ alkenyl, $C_1$–$C_{20}$ alkynyl, $C_3$–$C_7$ cycloalkyl, $C_3$–$C_7$ cycloalkenyl, or heterocycle substituent, and wherein the substituents can be substituted or unsubstituted.

20. The process of claim 19, wherein $R^1$ and $R^2$ are hydrogen.

21. The process of claim 14, wherein the anhydride is a maleic anhydride of the general formula:

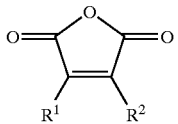

wherein $R^1$ and $R^2$ are independently selected from hydrogen, hydroxyl, amino, trimethyl amino, sulfonate, $C_1$–$C_{20}$ alkyl, $C_1$–$C_{20}$ alkenyl, $C_1$–$C_{20}$ alkynyl, $C_3$–$C_7$ cycloalkyl, $C_3$–$C_7$ cycloalkenyl, or heterocycle substituent, and wherein the substituents can be substituted or unsubstituted.

22. The process of claim 21, wherein $R^1$ and $R^2$ are hydrogen.

23. The process of claim 14, wherein the gamma keto carboxyl containing functional group is a succinic acid derivative having the general formula:

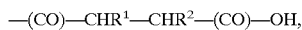
—(CO)—CHR$^1$—CHR$^2$—(CO)—OH, wherein R1 is hydrogen, hydroxyl, amino, trimethyl amino, sulfonate, C1–C20 alkyl, C1–C20 alkenyl, C1–C20 alkynyl, C3–C7 cycloalkyl, C3–C7 cycloalkenyl, or heterocyclic substituent, wherein the substituents can be substituted or unsubstituted.

24. The process of claim 23, wherein $R^1$ and $R^2$ are hydrogen.

25. The process of claim 14, wherein the gamma keto carboxyl containing functional group is a maleic acid derivative having the general formula:

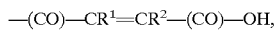
—(CO)—CR$^1$=CR$^2$—(CO)—OH, wherein $R^1$ is hydrogen, hydroxyl, amino, trimethyl amino, sulfonate, $C_1$–$C_{20}$ alkyl, $C_1$–$C_{20}$ alkenyl, $C_1$–$C_{20}$ alkynyl, $C_3$–$C_7$ cycloalkyl, $C_3$–$C_7$ cycloalkenyl, or heterocyclic substituent, wherein the substituents can be substituted or unsubstituted.

26. The process of claim 25, wherein R1 and R2 are hydrogen.

27. The process of claim 14, wherein the carboxylate containing functional group is a phthalic acid derivative having the general formula:

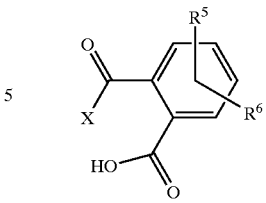

wherein "X" represents the carbonaceous material, wherein $R^5$ and $R^6$ can be independently positioned on any carbon within the six member ring and are independently selected from hydrogen, hydroxyl, amino, trimethyl amino, sulfonate, $C_1$–$C_{20}$ alkyl, $C_1$–$C_{20}$ alkenyl, $C_1$–$C_{20}$ alkynyl, $C_3$–$C_7$ cycloalkyl, $C_3$–$C_7$ cycloalkenyl, or heterocycle substituent, and wherein the substituents can be substituted or unsubstituted.

28. The process of claim 27, wherein R5 and R6 are hydrogen.

29. The process of claim 14, wherein the suitable solvent comprises dimethylacetamide, dimethylsulfoxide or dimethyl formamide.

30. The process of claim 14, wherein the conditions of step b) comprise the presence of a suitable catalyst.

31. The process of claim 30, wherein the catalyst is anhydrous aluminum chloride.

32. The process of claim 14, further comprising:
c) treating the surface modified carbonaceous material produced in step b) with a neutralizing agent under conditions effective to provide a surface modified carbonaceous material comprising a plurality of gamma-keto-carboxyl containing functional groups having the general formula —(CO)—CR$^1$R$^3$—CR$^2$R$^4$—(CO)—OM surface bonded thereto, wherein M is a cationic species.

33. The process of claim 32, wherein the cationic species is selected from ammonium, sodium, potassium and lithium.

34. The process of claim 32, wherein M is sodium.

35. The process of claim 32, wherein the neutralizing agent is sodium hydroxide solution having a concentration in the range of from approximately 0.75M to approximately 1.5M.

36. The process of claim 32, further comprising:
d) filtering and substantially drying the surface modified carbonaceous material produced in step c) at a temperature of at least approximately 100° C.

37. An aqueous composition, comprising the surface modified material of claim 1 and water.

38. The composition of claim 37, wherein the composition is an ink and wherein the composition further comprises at least one acrylic polymer and an organic solvent.

39. The composition of claim 37, wherein the composition is an aqueous dispersion and wherein the surface modified carbonaceous material is a surface modified carbon black.

40. The composition of claim 39, wherein the surface modified carbon black is present in an amount in the range of from approximately 1.0 wt. % to approximately 40.0 wt % relative to the entire aqueous composition.

41. The material produced by the process of claim 14.

42. The material produced by the process of claim 32.

43. The material of claim 42, wherein M is ammonium, sodium, potassium or lithium.

44. The material of claim 42, wherein M is sodium.

* * * * *